Jan. 5, 1926. 1,568,583
D. A. ANDERSON
TESTER FOR CONNECTING ROD ASSEMBLIES
Filed Sept. 10, 1924  2 Sheets-Sheet 1
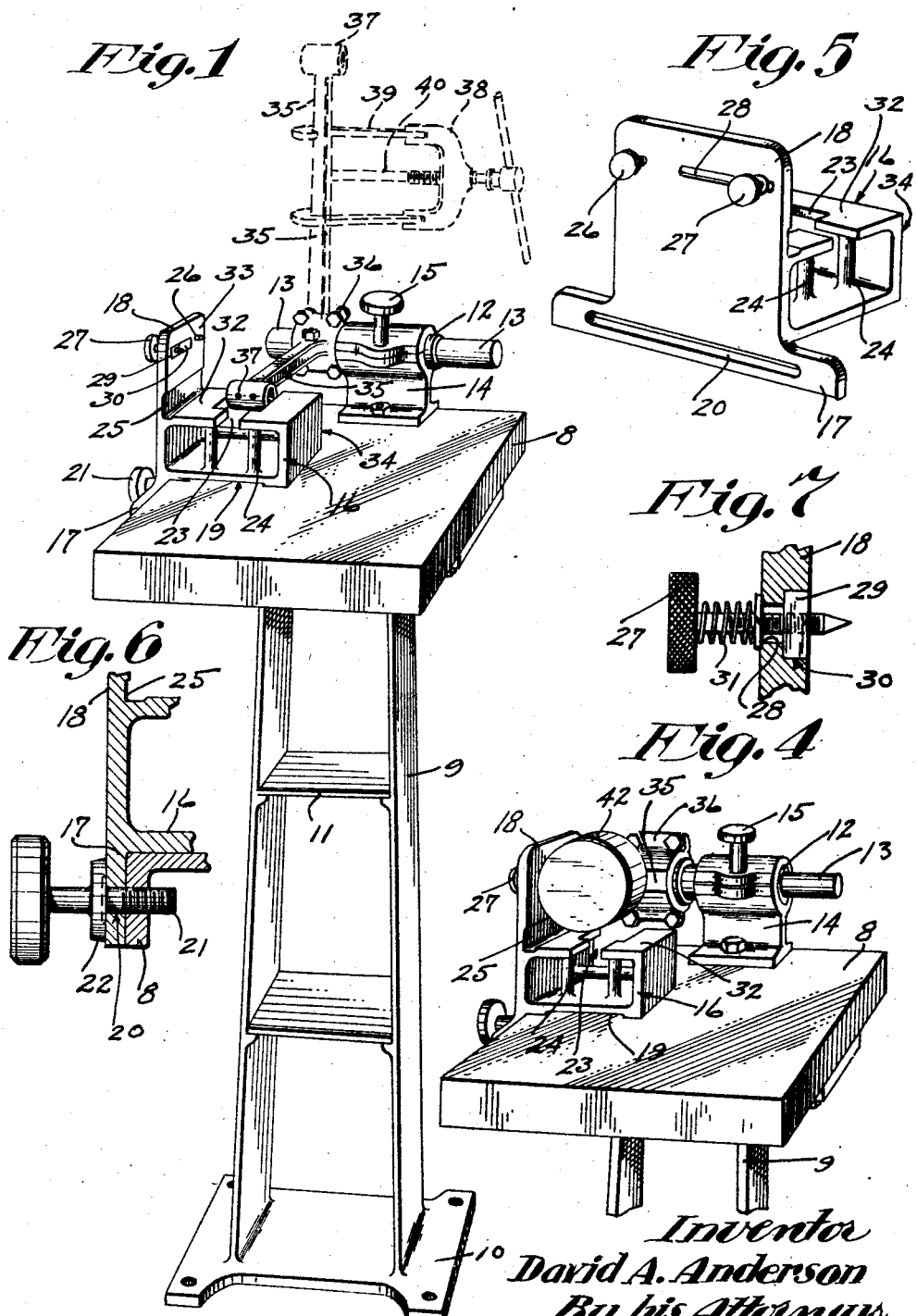
Inventor
David A. Anderson
By his Attorneys
Merchant and Keegan Jan. 5, 1926.                                                                    1,568,583
                          D. A. ANDERSON
                 TESTER FOR CONNECTING ROD ASSEMBLIES
                    Filed Sept. 10, 1924        2 Sheets-Sheet 2
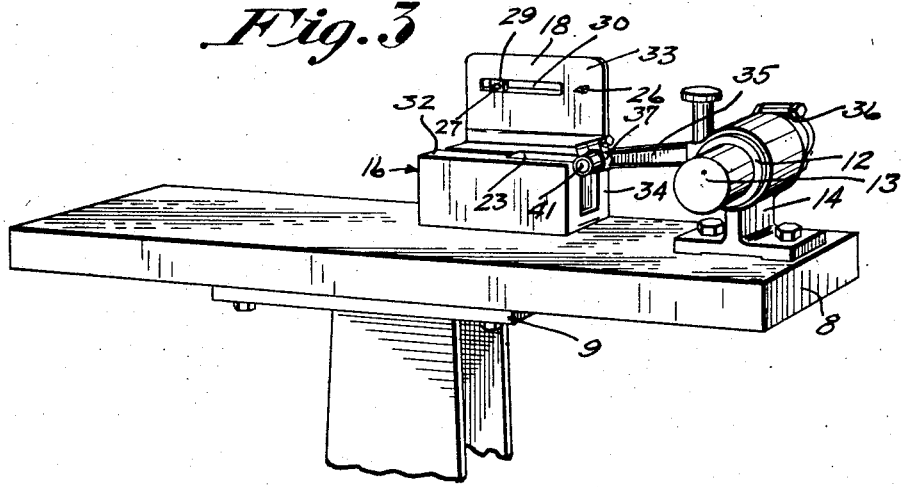
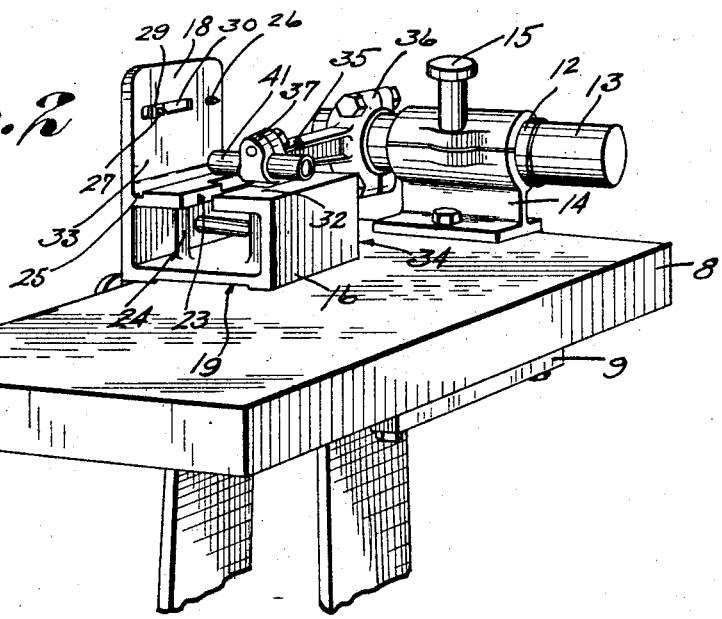
Inventor
David A. Anderson
By his Attorneys Patented Jan. 5, 1926.

1,568,583

UNITED STATES PATENT OFFICE.

DAVID A. ANDERSON, OF FARIBAULT, MINNESOTA.

TESTER FOR CONNECTING-ROD ASSEMBLIES.

Application filed Sepetmber 10, 1924. Serial No. 736,912.

*To all whom it may concern:*

Be it known that I, DAVID A. ANDERSON, a citizen of United States, residing at Faribault, in the county of Rice and State of Minnesota, have invented certain new and useful Improvements in Testers for Connecting-Rod Assemblies; and I do hereby declare the following to be a full, clear, and exact description of the invention, such as will enable others skilled in the art to which it appertains to make and use the same.

My present invention has for its object to provide an extremely simple and highly efficient alignment tester for connecting rod assemblies, and to this end it consists of the novel devices and combination of devices hereinafter described and defined in the claims.

In the accompanying drawings, which illustrate the invention, like characters indicate like parts throughout the several views:

Referring to the drawings:

Fig. 1 is a perspective view of the invention illustrating its use for testing a connecting rod for a lateral bend;

Fig. 2 is a perspective view of the invention with a portion of its stand broken away and illustrating its use for testing the connecting rod and its assembled wrist pin to determine whether or not the axis of the wrist pin is in the same plane as the axis of the crank shaft bearing of the connecting rod;

Fig. 3 is a view corresponding to Fig. 2 but illustrating the invention as used in testing the assembled connecting rod and wrist pin to determine whether or not the axis of the wrist pin is parallel to the axis of the crank shaft bearing of the connecting rod;

Fig. 4 is a view corresponding to Fig. 2 but illustrating the invention as used in testing an assembled connecting rod, wrist pin and piston to determine whether or not the axis of the piston extends at a true right angle to the axis of the crank shaft bearing of the connecting rod;

Fig. 5 is a perspective view of the aligned block removed from the bed;

Fig. 6 is a fragmentary detail view with some parts sectioned on the irregular line 6—6 of Fig. 1 on an enlarged scale; and Fig. 7 is a detail view with some parts sectioned on the line 7—7 of Fig. 5.

The numeral 8 indicates a flat, rectangular bed that is suitably ribbed to give the same necessary strength and to prevent warping and has its top and rear edge portion planed true. This bed 8 is bolted to a stand 9 having an extended base 10 which may be bolted to a floor and is provided with two shelves 11 for holding tools or other articles.

The numeral 12 indicates an arbor having end portions 13 of different diameters that represent standard crank shafts to which connecting rods are to be applied. This arbor 12 is mounted in a transversely divided bearing 14 having a binding screw 15 by which said bearing is frictionally clamped onto the arbor 12 to prevent said arbor from turning therein. The bearing 14 is removably bolted to the top of the bed 8 at one end thereof and supports the arbor 12 with its axis parallel to the top of the bed and at right angles to the back of the bed.

Removably mounted on the top of the bed 8 is a hollow, open ended, rectangular aligning block 16 having at its back a depending guide flange 17 and an upstanding flange 18. The top and bottom of the aligning block 16 are planed true so that they extend in planes that are parallel to the top of the bed 8. Formed in the bottom of the aligning block 16 is a shallow channel 19 which extends from one end of said block to the other so that only the longitudinal edge portions of the bottom face of said aligning block rest on the bed 8.

The front face of the flange 17 is planed true and has sliding contact with the back of the bed 8 and guides the aligning block 16 for true sliding movement toward and from the arbor 12 and at a true right angle to the axis thereof. Formed in the flange 17 is a longitudinal slot 20 through which extends a hand screw 21 that has screw-threaded engagement with the back of the bed 8. This hand screw 21 has a large, disc-like shoulder 22 which impinges against the flange 17 and clamps the same onto the bed 8 to hold the aligning block 16 in different adjustments from the arbor 12. Two or more horizontally spaced screw-threaded holes may be formed in the back of the bed 8 to receive the hand screw 21 so that said screw may be adjusted to bring its shoulder 22 substantially at the longitudinal center of the flange 17 and thereby more securely clamp said flange onto the bed 8. Extending completely through the top of the aligning block 16, from one end to the other thereof, is a channel 23 of different widths, the sides of which extend at true right angles from the axis of the arbor 12. A plurality of posts 24 are cast within the aligning block 16 and support and reinforce the top of said block at the channel 23.

The front face of the flange 18 is planed smooth and extends at a true right angle from the top of the aligning block 16 and at a true right angle from the axis of the arbor 12. The back edge portion of the top of the aligning block 16 and the lower edge portion of the flange 18 are reduced at 25 to facilitate the planing of the surfaces of said top and the front face of the flange 18.

The end of the aligning block 16 toward the arbor 12 is planed smooth and extends at a true right angle to the back of the bed 8 and at a true right angle to the top of said bed.

Two horizontally spaced thumb screws 26 and 27 extend through the flange 18 from the back thereof and have needle points which may be projected outward of the front face of said flange to be engaged by a piston, as will presently appear. The screw 26 has threaded engagement with the flange 18 and the screw 27 extends loosely through a horizontal slot 28 in said flange and has threaded engagement with a square nut 29 slidably mounted in a horizontal channel 30 in the front face of the flange 18. A coiled spring 31, encircling the screw 27, is compressed between the head of said screw and the flange 18 and holds the nut 29 on the bottom of the channel 30. The sides of the channel 30 hold the nut 29 from turning. The finished top of the aligning block 16, the finished face of the flange 18, and the finished end of said block afford testing surfaces 32, 33 and 34 respectively.

To test a connecting rod 35, having a crank shaft bearing 36 and a wrist pin bearing 37 for a lateral bend, the arbor 12 is secured in the bearing 14 with the end portion thereof to be used turned toward the back of the bed 8. The crank shaft bearing 36 is then slipped over the rear projecting end portion of the arbor 12 and is adjusted thereon in the same manner as in adjusting the same on a crank shaft. The connecting rod 35 is then turned downward to bring its wrist pin bearing 37 over the aligning block 16, and said aligning block is adjusted on the bed 8 to position the same so that the wrist pin bearing 37 may be inserted into that portion of said channel which has a width nearest to the width of said bearing, see Fig. 1. The hand screw 21 is then operated to hold the aligning block 16.

If the distance between the ends of the wrist pin bearing 37 and the respective sides of the channel 23 are the same, the connecting rod 35 is straight. If this distance is not the same, the connecting rod 35 must be straightened, preferably by one of my connecting rod straighteners indicated by broken lines in Fig. 1 which comprises a U-shaped head 38, to the side members of which is pivoted a pair of hook-like grapples 39 adapted to engage the connecting rod 35, and a long screw 40 having threaded engagement with the head 38 and adapted to impinge against the opposite side of the connecting rod 35 from that engaged by the grapples 39 and at a point midway therebetween. By operating this screw 40 the connecting rod 35 may be sprung to straighten the same. This connecting rod straightener need not be removed from the connecting rod 35 while the same is being tested from time to time by inserting its wrist pin bearing 37 into the channel 23. The side of the connecting rod 35 that is to be engaged by the screw 40 depends on which way the connecting rod 35 is to be sprung to straighten the same.

To test the connecting rod 35 for a twist, a wrist pin 41 is mounted in the bearing 37 to which a bushing has been applied, and the connecting rod 35 is turned down over the aligning block 16 to cause the wrist pin 41 to engage the testing surface 32 at each side of the channel 23 with its bearing 37 extending into said channel (see Fig. 2). If the wrist pin 41 rests flat on the testing surface 32 there is no twist in the connecting rod 35, but if only one of its ends 41 rests on said surface the twist must be taken out of the connecting rod 35 by a suitable tool. While taking the twist out of the connecting rod 35 the same may be turned into a vertical or oblique position and then turned down from time to time to make the necessary tests to determine whether or not the wrist pin 41 rests flat on the testing surface 32.

To test the assembled connecting rod 35 and wrist pin 41 to determine whether or not the axis of said wrist pin extends parallel to the axis of the crank shaft bearing 36, the aligning block 16 is moved away from the arbor 12 and the connecting rod 35 turned into a horizontal position and then said block is moved toward the arbor 12 until its testing surface 34 engages the wrist pin 41 with its bearing 37 extending into the front open end of said block. If the wrist pin 41 rests flat on the testing surface 34, said wrist pin is properly aligned in respect to the axis of the crank shaft bearing 36. In case only one end of the wrist pin engages the testing surface 34, it will be necessary to spring the connecting rod 35 laterally to correct the position of the wrist pin 41.

A piston 42 having a straight skirt is then mounted on the wrist pin 41 and to test the assembled connecting rod 35, wrist pin 41 and piston 42 to determine whether or not the axis of said piston and the diametrically opposite sides thereof at the ends of the wrist pin 41 extend at true right angles to the axis of the crank shaft bearing 36, the thumb screws 26 and 27 are unscrewed so that their points do not project beyond the testing surface 33. The aligning block 16 is then adjusted so that the piston 42 overlies the top thereof and the crank shaft bearing 36 adjusted axially on the arbor 12 to cause the skirt of the piston 42 to engage the testing surface 33. If the respective side of the piston 42 engages the testing surface 33 throughout its full length, the connecting rod assembly is removed from the arbor 12, given a one-half turn on its longitudinal axis and again mounted on said arbor to bring the opposite side of the piston 42 in a position to be tested on the testing surface 33. If both sides of the piston 42 engage the testing surface 33 throughout their full lengths, the indication is that the several members of the connecting rod assembly are correctly aligned.

When a connecting rod assembly has a piston with a skirt having different diameters, the thumb screws 26 and 27 are used instead of the testing surface 33 and are screwed outward to engage the respective side of the piston at its different diameters. The connecting rod assembly is then removed from the arbor 12, given a one-half rotation on its longitudinal axis and again mounted on the arbor 12, and if the respective side of said piston engages both thumb screws 26 and 27, the indication is that the several members of the connecting rod assembly are correctly aligned. The sliding nut 29 permits the thumb screw 27 to be adjusted toward or from the thumb screw 26 so that both of said screws will engage pistons of different lengths.

By removing the arbor bearing 14 and aligning block 16 from the bed 8, said bed may be used as a work table in testing cylinder heads, cementing on gaskets for oil pans, truing up clutch plates, and numerous other such jobs.

What I claim is:

1. A tester for connecting rod assemblies comprising a bed, an arbor mounted on the bed, and an aligning block mounted on the bed for adjustment radially toward or from the axis of the arbor, and having vertical and horizontal testing surfaces for the wrist pin of a connecting rod mounted on the arbor, said block having at one side a flange perpendicular to the arbor and affording a testing surface for a piston mounted on the wrist pin.

2. A tester for connecting rod assemblies comprising a bed, an arbor mounted on the bed, and an aligning block mounted on the bed for adjustment radially toward or from the axis of the arbor and having vertical and horizontal testing surfaces for the wrist pin of a connecting rod mounted on the arbor, said block also having upper and lower flanges perpendicular to the axis of the arbor, said lower flange engaging the back of the bed as a guide, means for securing the block to the bed in different adjustments in respect to the arbor, said upper flange affording a testing surface for a piston mounted on the wrist pin.

3. A test for connecting rod assemblies comprising a bed, an arbor mounted on the bed, and an aligning block mounted on the bed for adjustment radially toward or from the axis of the arbor and having vertical and horizontal testing surfaces for the wrist pin, of a connecting rod mounted on the arbor, said block also having upper and lower flanges perpendicular to the axis of the arbor, said lower flange engaging the back of the bed as a guide and having a longitudinal slot, a clamping screw extending through said slot and having screw-threaded engagement with the bed for securing said block to the bed in different adjustments, said upper flange affording a testing surface for a piston mounted on the wrist pin.

4. A tester for connecting rod assemblies comprising a bed, an arbor mounted on the bed and an aligning block on the bed, and means for securing the aligning block to the bed for adjustments radially toward and from the axis of the arbor, said aligning block having a channel adapted to receive the wrist pin bearing of a connecting rod mounted on the arbor, the top of said block and the end thereof toward the arbor affording testing surfaces for a wrist pin mounted in said bearing, said block having at one side a flange perpendicular to said arbor and affording a testing surface for a piston mounted on the wrist pin.

5. The structure defined in claim 1 in further combination with a pair of piston-engaging needle points on said flange, at least one of which is axially adjustable.

6. The structure defined in claim 1 in further combination with a nut slidably mounted on the flange, and a pair of laterally spaced piston-engaging needle points, one of which is mounted on the flange and the other of which is mounted in the nut.

7. The structure defined in claim 1 in which the flange is provided with a channel and in further combination with a nut slidably mounted in said channel, two laterally spaced screws, one of which is mounted on the flange and the other of which is mounted in the nut for axial adjustment, and a coiled spring encircling the screw mounted in the nut and compressed between its head and the flange.

8. A tester for connecting rod assembles comprising a bed, an arbor mounted on the bed and an aligning block having at one side upper and lower flanges that are perpendicular to said arbor, said lower flange engaging the back of the bed as a guide and having a longitudinal slot, a hand screw extending through said slot and having threaded engagement with the bed and impinging against the lower flange to secure the same to the bed in different adjustments radially toward and from the axis of the arbor, the top of the aligning block being in an horizontal plane parallel to the axis of the arbor and the end of the aligning block toward the arbor being in a vertical plane parallel to the axis of the arbor, said top and end of the aligning block affording wrist pin testing surfaces, said upper flange being in a vertical plane that radially intersects the axis of the arbor and affords a piston testing surface, and a pair of screws mounted in the upper flange, one of said screws being laterally adjustable toward and from the other thereof.

In testimony whereof I affix my signature.

DAVID A. ANDERSON.